No. 610,115. Patented Aug. 30, 1898.
E. E. WHIPPLE.
SUPPORTING ATTACHMENT FOR HARROWS.
(Application filed Dec. 27, 1897.)
(No Model.)

Witnesses
Geo. E. Fuch
Josephine C. Peck.

Inventor
E. E. Whipple
per Hubert Peck
Attorney

United States Patent Office.

EFFINGER E. WHIPPLE, OF UTICA, NEW YORK.

SUPPORTING ATTACHMENT FOR HARROWS.

SPECIFICATION forming part of Letters Patent No. 610,115, dated August 30, 1898.

Application filed December 27, 1897. Serial No. 663,684. (No model.)

*To all whom it may concern:*

Be it known that I, EFFINGER E. WHIPPLE, a citizen of the United States, residing at Utica, in the county of Oneida and State of New York, have invented certain new and useful Improvements in Supporting Attachments for Harrows; and I do hereby declare the following to be a full, clear, and exact description of the invention, such as will enable others skilled in the art to which it appertains to make and use the same.

This invention relates to certain improvements in harrows, and more particularly to improvements in riding or wheeled supporting attachments for harrows; and the objects and nature of the invention will appear more particularly and specifically hereinafter.

The invention consists in certain novel features in construction and in combinations and in arrangements and details, as more fully and particularly pointed out and specified hereinafter.

Figure 1:
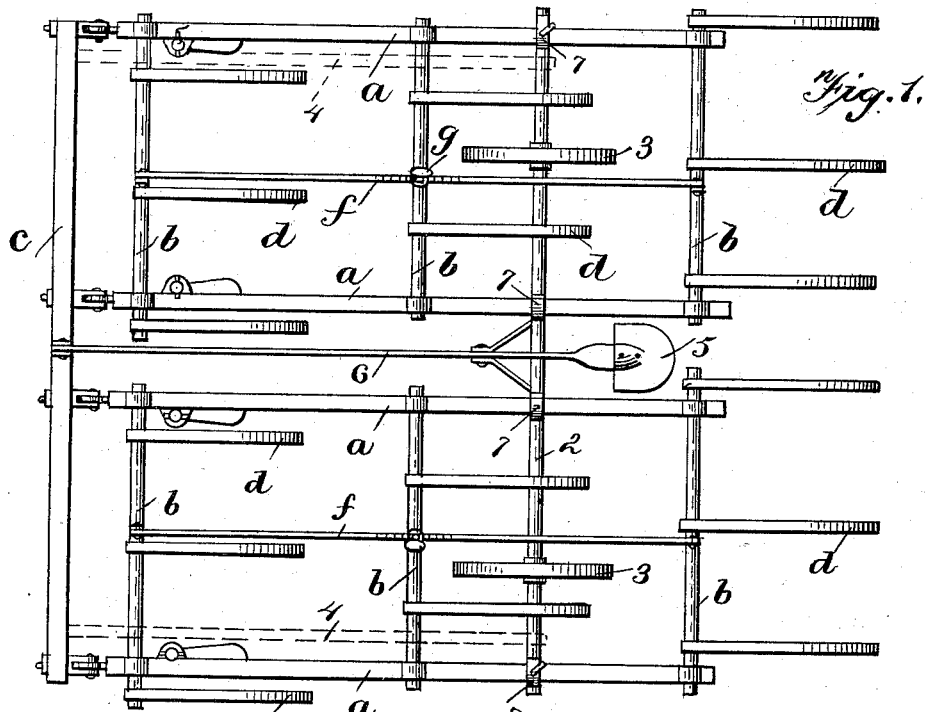
Figure 2:
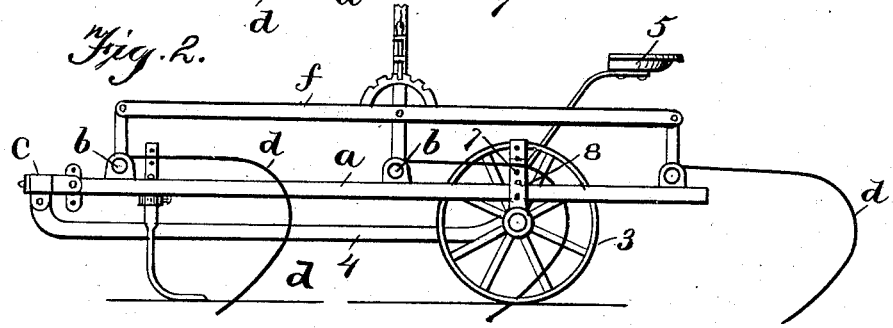
Figure 3:
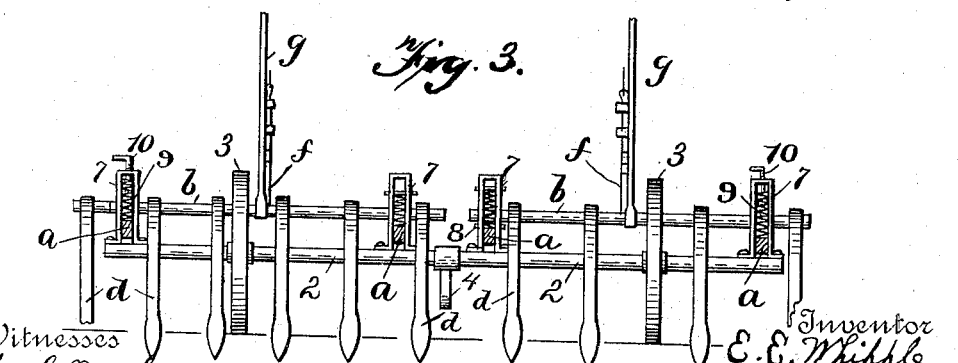

Referring to the accompanying drawings, which illustrate one construction embodying my present invention, Figure 1 is a top plan view of a two-section lever-adjustment harrow provided with the supporting attachment of my invention. Fig. 2 is a side elevation. Fig. 3 is a rear view.

In the drawings I illustrate my invention applied to a two-section lever-adjustment harrow. Each section has the frame-bars *a a* running fore and aft, with the transverse turnable tooth-bars *b* confined thereto and provided with long curved spring-teeth *d*. The harrow-sections are usually arranged parallel with each other, and a long evener-bar *c* is arranged in front of both sections, and each section is at its front corners coupled thereto to receive its draft therefrom.

An adjusting-bar *f* extends over the tooth-bars of each section and is pivoted to arms rigid with and extending up from the tooth-bars, one of which—for instance, an intermediate tooth-bar—is provided with the upright adjusting-lever *g*, rigid therewith and extending above and pivoted to the adjusting-bar, so that the tooth-bars can be raised or lowered together to lift or lower the teeth simultaneously, a toothed segment and pawl being provided to lock the parts and the teeth in the desired position.

Any suitable depending supports are provided at the forward portion of the harrow to uphold the same when the teeth are elevated. For instance, I show shoes attached to the frame for this purpose, although other devices can be employed.

The wheeled supporting attachment comprises a long supporting frame or axle 2, arranged transversely beneath both sections of the harrow, preferably just in rear of the transverse center of the harrow, although such arrangement can be varied. This axle 2 preferably extends transversely beside both the outer and inner frame-bars of the sections and is mounted on suitable supporting-wheels 3, preferably within the harrow-sections and between the tooth-bars and teeth, and where but two wheels are employed they are preferably arranged near the central portions of the sections, respectively, about as shown in Fig. 1. The axle is suitably coupled with the draft—as, for instance, draft links or tongues 4, as shown by dotted lines in Fig. 1 and full lines in Fig. 2, can extend from the end portions of the axle forwardly beneath the tooth-bars and harrow-frames to and loosely coupled with the front evener-bar or other parts at the front of the harrow. When such draft arrangement is employed, the rider's seat 5 is mounted above the central portion of the axle at the central part of the harrow by suitable upright supports, so that the occupant is within easy reach of the tooth-bar-adjusting levers; also, instead of the two or more draft tongues or connections 4 extending forwardly beneath the harrow-sections, an elevated draft-tongue 6 can be employed, arranged above the axle and carrying the seat and having the braces secured to the tongue and extending down and secured to the axle, as shown in Fig. 1. The tongue 6 extends forwardly centrally of the harrow and is coupled centrally to the evener-bar or to other parts at the front of the harrow. However, various other draft or connecting devices for the wheeled support might be employed without departing from my invention.

As before noted, the side frame-bars of the harrow-sections are arranged above the wheeled axle within the frame, and hence when the teeth are elevated the harrow is upheld and balanced on said wheeled axle and the frame-bars rest thereon or are upheld thereby, while the supporting-shoes, usually arranged a distance rearwardly from the front end of the harrow, prevent the same tilting forward during transportation, at which time said shoes touch the ground lightly, but do not ordinarily sustain sufficient of the weight of the harrow to materially increase the draft by friction of such shoes on the ground, the harrow being almost entirely carried by and practically balanced on the wheeled support. The harrow-sections when the teeth are working have free and independent play above said wheeled support, but, if desired, can be held in line and against independent lateral swaying or play, and the wheeled support can be held in the same relation to the harrow-sections by suitable means—such, for instance, by providing the axle with guides through which the frame-bars loosely pass.

The guides 7 can be formed inverted-U shape in form, with their lower ends rigidly secured to the axle, the guides extending vertically therefrom, with the frame-bars confined between the sides or legs of the guides, which hold the frame-bars against lateral movement, but are of sufficient vertical length to permit independent vertical movement of the harrow-sections.

Means can be provided to lock or hold the frame-bars against movement independently of the wheeled support, and thus throw the weight of the support and rider on the harrow, and also to vary the vertical play of the harrow-sections and vary the limit of downward movement thereof if it is not desired to lock or hold the sections to the wheeled support. Such results can be attained by providing said guides 7 with vertically-adjustable stops. Each guide can be formed with a vertical series of transverse holes, and 8 is a transverse pin inserted through the same above or below the frame-bar; also, springs 9 can be adjustably arranged in the guides above the frame-bars to limit the upward movement of the sections and yieldingly hold the same down to their work. These springs can be adjustably controlled by the transverse pins or can be carried by adjusting-screws 10, screwing through the top of the guide. I do not limit the invention to the employment of the springs, and only show them in several of the guides to illustrate how the same can be employed. I do not limit the invention to the employment of the guides, although, so far as I am at present advised, I prefer to employ them.

I show the axle beneath the teeth of intermediate or central tooth-bars, and hence said teeth are usually formed rather long to attain the proper action thereof; but the invention is not limited in this regard.

When the teeth of the harrow are raised, it will be observed that the frame-bars of each section are supported on the axle. For instance, the harrow shown in the drawings rests on the axle at four points with the supporting-wheels between the frame side bars of the harrow.

Of course it is obvious that the axle or supporting-bar 2 might be arranged transversely of the harrow-sections and frame-bars thereof otherwise than in a plane below said frames and yet be arranged to directly or indirectly uphold the sections in a certain plane and permit vertical play of the sections above said plane whether the teeth be in or out of operative engagement with the soil. It should also be noted that material advantages in operation and practical results are attained by providing an independent riding attachment provided with a support or supports near the transverse central portion of the harrow, as thereby almost the entire weight of the harrow is sustained by the support when the teeth are elevated and the harrow is held balanced, and, if desired, the rider from his seat in rear of the support can place his feet on the rear portion of the harrow and rock the harrow to swing up the front end thereof. It will thus be observed that the harrow is held bodily elevated when the teeth are raised, so that the teeth can be forced down by the rider in his seat without requiring the harrow-frame to be first elevated.

It is evident that various changes might be made in the forms, constructions, and arrangements of the parts described without departing from the spirit and scope of my invention, and hence I do not wish to limit my invention to the constructions set forth.

What I claim is—

1. A harrow having a wheeled supporting attachment extending transversely beneath all the side frame-bars of the harrow and having supporting-wheels within the harrow-frame and draft connections.

2. A harrow having the axle arranged transversely beneath the inner and outer side frame-bars of the harrow with supporting-wheels, and draft connections extending forwardly and connected with the draft of the harrow.

3. A harrow having a supporting attachment extending beneath the side frame-bars thereof with supporting-wheels between said frame-bars, and draft connections, and arranged to permit independent vertical play of the harrow and to uphold the same by the frame-bars when the teeth are elevated.

4. A two-section lever-adjustment harrow having a wheeled support extending transversely beneath the inner and outer side frame-bars of both sections between tooth-bars thereof and beneath the harrow-teeth, and draft connections from the support connected with the draft of the harrow.

5. A wheeled supporting attachment for a harrow having draft attachments and guides to receive the harrow-frame bars provided with springs to yieldingly hold the harrow down to work, substantially as described.

6. A wheeled supporting attachment for harrows comprising the axle having wheels, a forwardly-extending draft-tongue, and inclosing guides to receive parts of the harrow and rigid with the axle and elongated vertically, substantially as described.

7. A harrow having a wheeled supporting attachment loosely connected thereto to permit independent vertical movement of the harrow, and springs carried by the wheeled support and yieldingly holding down the harrow to work, substantially as described.

8. A wheeled supporting attachment for harrows having vertical guides to hold the harrow against lateral swaying and permit independent vertical movement, substantially as described.

9. A two-section harrow having a front evener-bar, and supporting devices from the side frame-bars a distance back from the front ends thereof, and a wheeled axle, coupled with the draft of the harrow and extending transversely beneath the harrow-sections and the inner and outer frame-bars thereof and between the tooth-bars thereof and beneath the teeth of the tooth-bars immediately in front thereof.

10. A two-section harrow having a wheeled supporting attachment arranged transversely thereof and loosely connected with the draft thereof to permit independent vertical play of the sections and to uphold the same when the teeth are raised, said attachment holding the sections in line and against independent lateral swaying, substantially as described.

11. A curved-spring-tooth rocking-tooth-bar harrow comprising several independent sections, in combination with an independent wheeled riding attachment moving forward with the harrow and provided with a support arranged about at the transverse central portion of the harrow and constructed and arranged to balance each section at opposite sides of the section and sustain practically the entire weight thereof in a certain plane with the section-frame elevated from the ground and permit independent play of each section above such plane, substantially as described.

12. A rocking-tooth-bar curved-spring-tooth harrow, in combination with an independent riding attachment moving forward with the harrow and having a support arranged transversely of the harrow about at the transverse central portion thereof and upholding opposite side portions of the harrow in a certain elevated plane and permitting independent play thereof above said plane, and whereby the harrow is balanced from the attachment and practically the entire weight thereof is carried by the attachment, substantially as and for the purposes stated.

13. A lever-adjustment curved-spring-tooth harrow, in combination with a wheeled supporting attachment having a seat and comprising an axle in length approximately equal to the width of the harrow and arranged transversely thereof at about the transverse central portion of the harrow and having wheels between the frame and tooth bars of the harrow, said axle supporting and balancing the harrow in an elevated position whether the teeth are in or out of operative engagement with the soil and permitting independent movement of the harrow above such position, substantially as described.

14. A two-section harrow, in combination with a wheeled riding attachment moving forward with the harrow and comprising an axle arranged transversely of the side frame-bars of each section at an intermediate portion thereof, and provided with supporting-wheels approximately within the longitudinal central portions of the sections, respectively, said axle supporting each section from points on opposite sides thereof and intermediate the longitudinal length of said section, whereby the section-frames are carried in an elevated plane above the ground, substantially as described.

15. A lever-adjustment curved-spring-tooth harrow having its adjusting-lever on an intermediate tooth-bar, in combination with an independent wheeled riding attachment moving forward with the harrow and arranged about at the transverse central portion of the harrow and provided with a rider's seat, said attachment provided with a support upholding the harrow at the frame sides thereof in an elevated plane above the ground so that the harrow is balanced from the support and practically its entire weight is carried thereby, whereby the harrow-frame is held elevated when the teeth are raised so that the teeth can be lowered by said lever without lifting the frame.

16. A several-section lever-adjustment harrow having depending frame-supports in advance of its transverse center, in combination with an axle arranged transversely of the several sections and the frame-bars thereof and provided with supporting-wheels, said axle arranged transversely of the sections a distance in advance of their rear ends and having a forwardly-extending draft connection to the draft of the harrow, each section being supported or upheld by its opposite side frame-bars from said axle in an elevated plane above the ground and independently movable vertically above said plane, substantially as described.

17. A lever-adjustment curved-spring-tooth harrow comprising several independent sections, and an independent wheeled riding attachment therefor combined with and arranged in respect to said sections as to uphold and balance each section on its opposite side frame-bars and at intermediate points thereof and thereby support the section-frames in an elevated plane above the soil and permit independent play thereof above such plane, substantially as described.

18. A several-section harrow having a front evener-bar, in combination with a wheeled riding and supporting attachment having a draft-bar rigid therewith and extending forwardly beneath the plane of the tooth-bars of the harrow and at its front end secured to the evener-bar, substantially as described.

19. A harrow, in combination with a wheeled axle carrying a seat, the harrow having a vertical movement independently of said axle, and a draft bar or tongue from the axle extending forwardly of the harrow beneath the plane of its tooth and frame bars and at the front coupled with the draft of the harrow, substantially as described.

20. A harrow, in combination with an independent wheeled riding attachment coupled with the draft of the harrow and provided with vertical elongated guides embracing parts of the harrow and permitting vertical play of the harrow independently of said wheeled attachment and provided with stops limiting the play of the harrow.

In testimony whereof I affix my signature in presence of two witnesses.

EFFINGER E. WHIPPLE.

Witnesses:
 HUBERT E. PECK,
 GEO. E. FRECH.